United States Patent [19]
Gomez

[11] Patent Number: 5,823,224
[45] Date of Patent: Oct. 20, 1998

[54] SLIDE VALVE

[75] Inventor: Luis Gomez, Bolivar, Venezuela

[73] Assignee: Brifer International Ltd., Bridgetown, Barbados

[21] Appl. No.: 883,090

[22] Filed: Jun. 26, 1997

[51] Int. Cl.[6] ............................. F16K 3/30; B22D 37/00
[52] U.S. Cl. ..................... 137/240; 137/375; 222/600; 251/326; 251/329
[58] Field of Search ...................... 137/240, 375; 222/561, 591, 600; 251/326, 327, 328, 329

[56] References Cited

U.S. PATENT DOCUMENTS

| | | | |
|---|---|---|---|
| 3,727,805 | 4/1973 | Shapland | 222/561 |
| 3,901,418 | 8/1975 | Klaus et al. | 222/561 |
| 3,937,372 | 2/1976 | Bode, Jr. | 222/561 |
| 3,964,507 | 6/1976 | Jandrasi et al. | 137/375 |
| 3,976,094 | 8/1976 | Jandrasi et al. | 137/375 |
| 4,421,256 | 12/1983 | Abarotin et al. | 222/600 |
| 4,541,453 | 9/1985 | Graf et al. | 137/375 |
| 4,573,616 | 3/1986 | Shapland | 222/600 |
| 4,615,506 | 10/1986 | Houston | 251/326 |
| 5,626,164 | 5/1997 | Richard et al. | 222/600 |

*Primary Examiner*—George L. Walton
*Attorney, Agent, or Firm*—Bachman & LaPointe, P.C.

[57] ABSTRACT

The present invention relates to a slide valve for use in high pressure, high temperature, erosive environments. The slide valve includes a valve housing, a liner defining a flow passage within the valve housing through which a medium which contains fluidized iron oxide particles can pass, a stationary valve member fixed relative to the flow passage, and a valve member movable relative to the flow passage and to the stationary valve member for restricting and/or blocking flow through the flow passage. The movable valve member has an orifice therein and is movable between a first position wherein the orifice is aligned with the flow passage and a second position wherein the orifice is non-aligned with the flow passage. The valve is in a fully closed position when a solid portion of the movable valve member closes the flow passage. In a partially open or partially closed positions a solid portion of the movable valve member partially obstructs the flow passage.

34 Claims, 4 Drawing Sheets

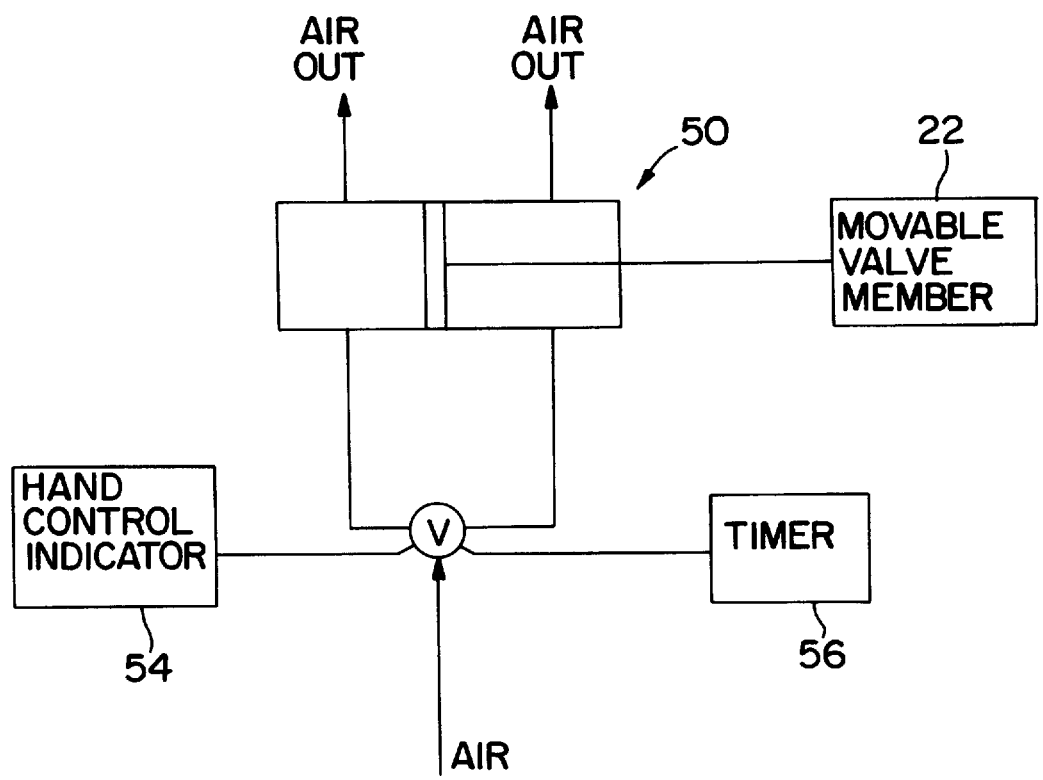
F I G. 4

SLIDE VALVE

BACKGROUND OF THE INVENTION

The present invention relates to a slide valve which can operate in high pressure, high temperature, erosive flow systems. The slide valve of the present invention has particular utility in equipment for the direct reduction of metal oxides containing iron to obtain a DRI metallized iron product.

In refineries and solids-handling systems, there is a need for slide valves which can operate in high pressure, high temperature, erosive flow systems. There are currently a number of slide valve systems used in these types of environments; however, there has been great difficulty in their operation.

Slide valves have been utilized in equipment for the direct reduction of metal oxides containing iron. These slide valves include two movable valve members with each valve member having an orifice that defines a portion of the material flow path when the valve is in an open position. The slide valve is typically surrounded by a refractory type insulating material. These slide valves have suffered from a number of deficiencies as a result of the environment in which they are employed. The high pressure and temperatures in the environment cause iron oxide particles in the flow stream to fluidize. These fluidized particles, travelling at high speed, impinge upon and adhere to surfaces of the valve elements. Eventually, the particles build up to a point where the two valve members become friction welded and inoperative. Additionally, the slide valves have suffered from the deficiency that the material flowing through the system at high pressure, temperature and speed tends to channel through the refractory material. Eventually, a path around the slide valve is created.

Another slide valve arrangement, which is utilized in a similar environment, is shown in U.S. Pat. No. 3,964,507 to Jandrasi et al. This arrangement includes a slide valve and a disc-like valve member having a valve surface or seat. Sliding movement of the slide valve across the valve surface of the valve member opens and closes the flow passage extending through the valve body. The valve arrangement is secured in place by a complex structure which includes an annular body in the form of a truncated cone. The Jandrasi et al. type of slide valve has experienced operating problems in those environments where there is a high pressure change across the valve. The valve was not designed to cycle in high pressure environments.

Thus, there remains a need for a slide valve which can function in high pressure, high temperature, erosive flow systems.

SUMMARY OF THE INVENTION

Accordingly, it is an object of the present invention to provide a slide valve which has improved operation in high pressure, high temperature, erosive flow system environments.

It is a further object of the present invention to provide a slide valve as above which substantially avoids sticking.

It is a further object of the present invention to provide a slide valve as above which is easy to install and easy to maintain.

The foregoing objects are attained by the slide valve of the present invention.

In accordance with the present invention, a slide valve for use in a high pressure, high temperature, erosive flow system environment comprises: a valve housing; means for defining a flow passage for a medium within said valve housing; a stationary valve member fixed relative to said flow passage; and a valve member movable relative to said flow passage for restricting and/or blocking flow through said flow passage. The movable valve member has an orifice therein and is movable between a first position wherein said orifice is aligned with the flow passage and a second position wherein said orifice is non-aligned with the flow passage.

Other details of the slide valve of the present invention, as well as other objects and advantages attendant thereto, are set forth in the following detailed description and the accompanying drawings wherein like reference numerals depict like elements.

BRIEF DESCRIPTION OF THE DRAWINGS

FIG. 4 is a schematic drawing of the system for operating the movable member in said slide valve.

DETAILED DESCRIPTION OF THE PREFERRED EMBODIMENT(S)

Figure 1:
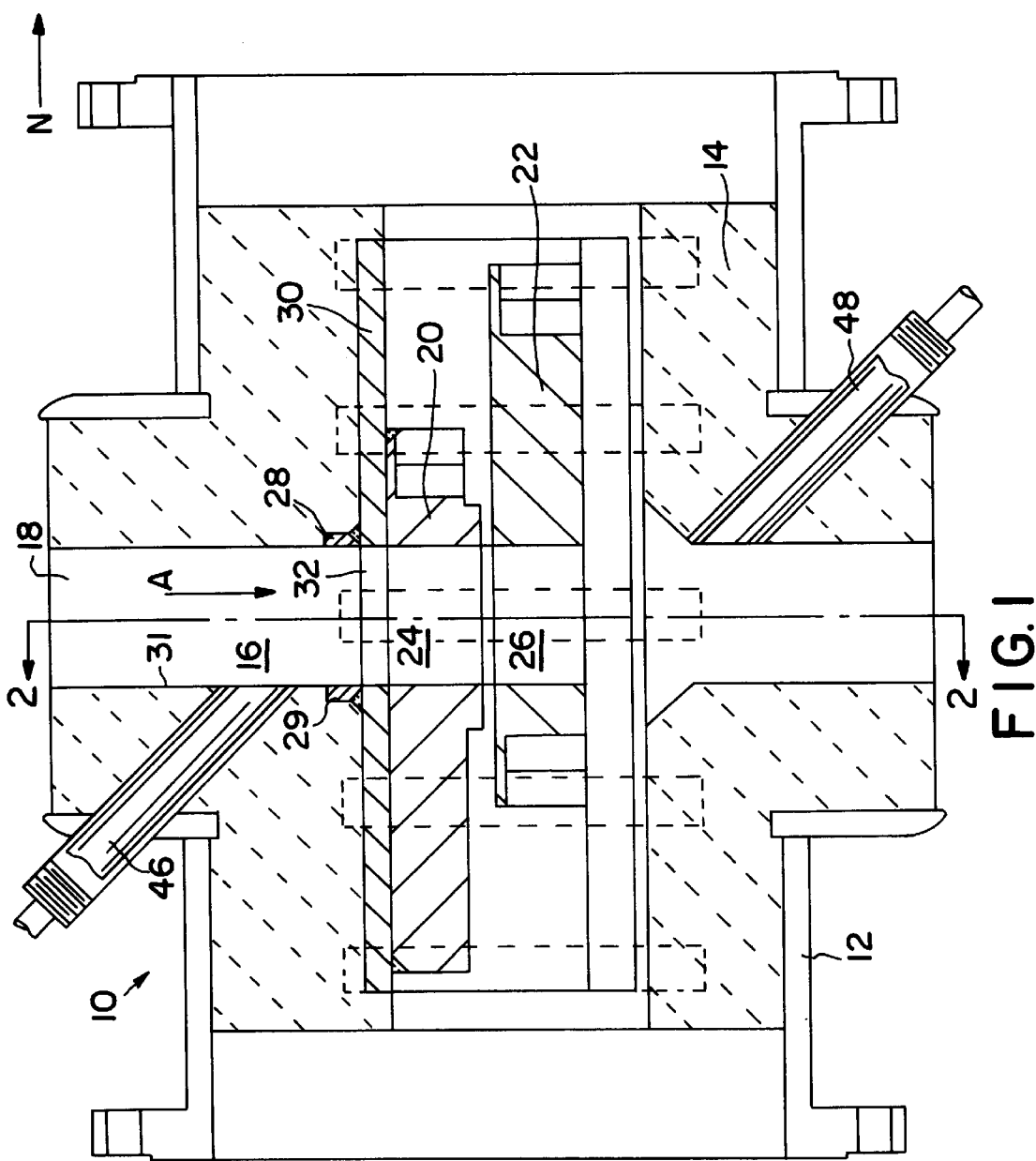
FIG. 1 is a cross-sectional view of the slide valve of the present invention.
Figure 2:
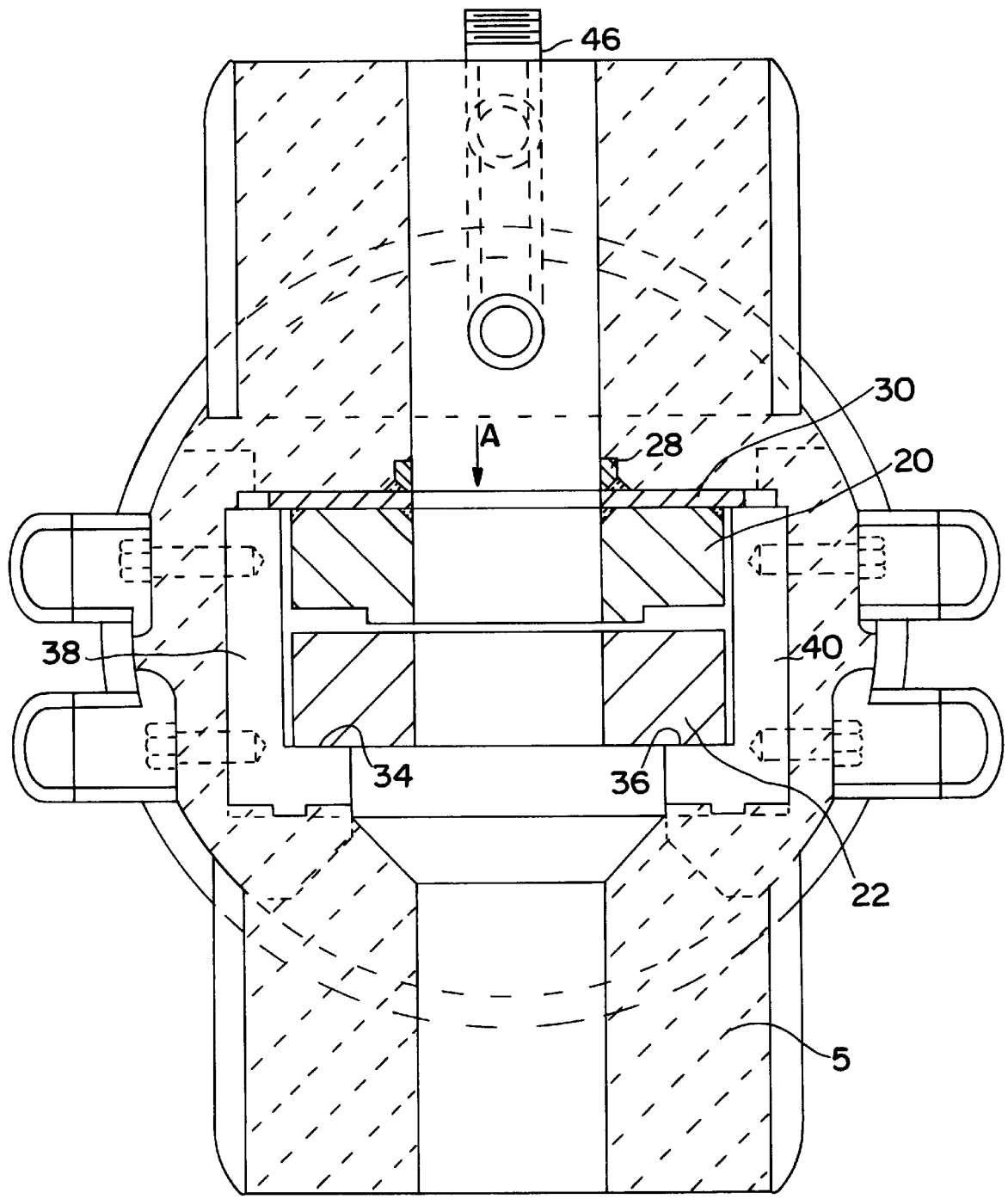
FIG. 2 is a sectional view of the slide valve of FIG. 1 taken along lines 2—2.

Referring now to the drawings, FIG. 1 illustrates a slide valve 10 suitable for use in a high pressure, high temperature, erosive flow system environment, such as in equipment for the direct reduction of metal oxides containing iron wherein a flow medium containing fluidized iron oxide particles travels at relatively high speeds. In such systems, the slide valve 10 is incorporated into a pipeline, conduit, or some other piece of equipment defining a portion of the flow path for said flow medium. As shown in this figure, the slide valve 10 includes a housing 12, which may be formed from a low cost, low temperature material such as carbon steel. The housing 12 may be joined to the pipeline, conduit or other equipment using any suitable means known in the art.

A castable, insulating refractory liner material 14 such as Resco RA-22 is used to line the housing 12. As shown in FIG. 1, the refractory material 14 is formed, preferably by casting, to have a central bore 16 which defines a fluid passageway 18.

The slide valve 10 further includes a stationary valve member 20 and a movable valve member 22. The valve members 20 and 22 may be formed from any suitable material known in the art. Preferably, they are formed from a material such as stainless steel. Each of the valve members 20 and 22 is provided with an opening 24 and 26, respectively. When the slide valve 10 is in a fully open position, the openings 24 and 26 are aligned with each other and the fluid passageway 18. Details on how the movable valve member 22 slides relative to the stationary member 20 will be discussed hereinbelow.

The slide valve 10 further includes a tube 28 and a plate 30. The tube 28 is preferably formed from a metallic material, such as a stainless steel, and serves to substantially prevent the medium flowing through the fluid passageway 18 from creating a channel around the valve members 20 and 22. As previously discussed, in some prior art devices, there has been no structure to prevent such channeling. As a result, the prior art valves became inoperative due to channels in the refractory material which allow the medium to flow around the valve members. As shown in FIG. 1, the tube 28 is inset in a recess in the refractory material 14. The inner wall 29 of the tube 28 is aligned with the wall 31 of the refractory material 14 which defines the fluid passageway 18.

The plate 30 is also formed from a metallic material, such as stainless steel. It too resides in a recess in the refractory material 14 and is provided to substantially prevent channelling around the valve members 20 and 22. The plate 30 is preferably joined to the tube 28 such as by welding. If desired, the plate 30 may also be joined to the refractory material 14 using suitable means known in the art such as an adhesive. The plate 30 is also joined to the stationary valve member 20 such as by welding. As shown in FIG. 1, the plate 30 has an opening 32 which is aligned with the fluid passageway 18 and the opening 24 at all times and with the opening 26 when the valve is in an open position.

The movable valve member 22 travels in a transverse direction relative to the path of the flow medium through the passageway 18. Any suitable means may be provided to guide the valve member 22. For example, the valve member 22 may travel along rails 34 and 36 defined by L-shaped supports 38 and 40 incorporated into the housing 12. Any suitable means known in the art may be used to move the valve member 22 along the rails 34 and 36. Preferably, an air piston type operator 50 with air on both sides of the piston is used to move the valve member 22 between its various positions. Using an air piston type operator, it is possible to move the valve member 22 so that it partially or completely restricts or blocks flow through the valve 10. When the valve 10 is in a fully closed position, the movable valve member 22 is positioned relative to the stationary valve member 20 so that the opening 24 in the stationary valve member 20 is covered by a solid portion of the movable valve member 22. In other words, in the valve fully closed position, the openings 24 and 26 are no longer aligned with each other. In a partially closed position, the valve member 22 is positioned relative to the stationary valve member 20 so that a solid portion of the movable valve member 22 partially covers a portion of the opening 24 in the stationary valve member 20.

As previously discussed, it is desired to move the valve member 22 using an air piston type operator 50. Using such an arrangement, a valve such as that of the present invention will travel full stroke in 4–5 seconds. The operating air used in the piston may be dry air at a pressure of about 6.5 bar. As shown in FIG. 4, the air is piped to the cylinder surrounding the piston during normal operation through a valve 52 whose position is set by means of a hand control indicator 54 to enable it to cycle from full open to part open. At a typically full capacity for a DRI reduction system in which the slide valve 10 is incorporated, the hand control indicator is set at about 50% opening. The open/close time is set by means of a timer 56 to enable the valve to be cycled. The timer 56 has a 60 second dial range with a minimum setting of 1 second. The dial preferably has two time scales including an outer scale for the "off" time and an inner scale for the "on" time. Each time scale has a dial pointer and knob for setting the exact "on" and "off" time desired. The timer 56 can be adjusted any time during the time cycle and can immediately pick up a new time setting. The timer 56 can be energized manually or can receive a signal from an outside source such as a level controller (not shown).

To provide maximum flexibility, the slide valve 10 of the present invention can operate in the following manner.

When there is no power to the timer 56, the slide valve 10 is closed. When power is provided to the timer 56 and there is no signal from the level controller (not shown), the valve 10 will cycle in accordance with the timer setting from open to part open depending on the value set in the hand control indicator 54. During normal operation, on level control, the valve 10 will cycle when the level in the reactor is above the set point of the level controller in accordance with the settings in the timer 56 and the hand control indicator 54. In the case of the failure of the valve positioning system, a back-up system is provided. In this back-up system, the air to the piston 50 is piped through solenoid valves (not shown) so that when the solenoids are energized, the valve 10 will travel full stroke. To adjust the opening percentage in this case, the timer 56 can be adjusted in order to limit the valve 10 from full open to part open if required.

Figure 3:
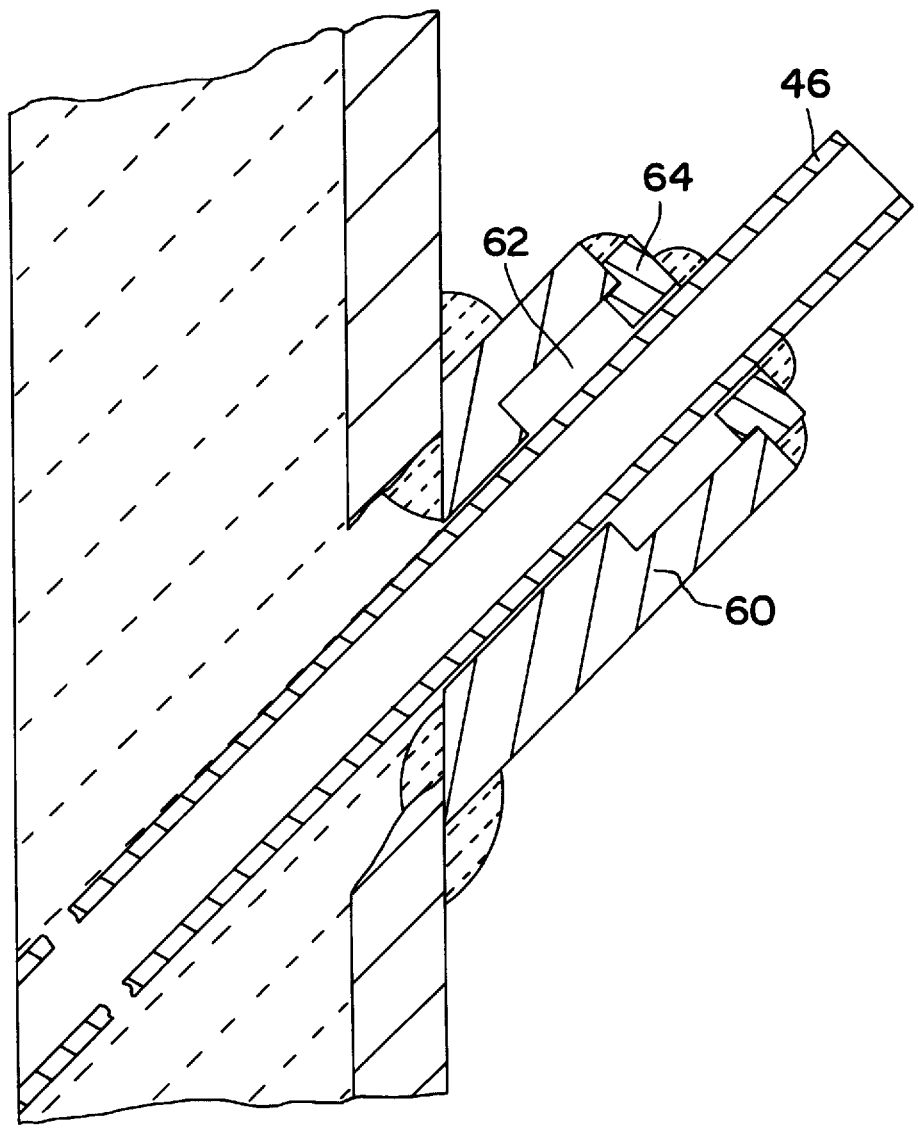
FIG. 3 is a sectional view of a portion of the slide valve of FIG. 1 illustrating the manner in which a tube for introducing purge into and for removing purged gases from the system is mounted to the slide valve housing.

When used in a system for the direct reduction of metal oxides containing iron, there typically is a high pressure differential across the valve members 20 and 22. At the inlet of the valve 10, typically one encounters a pressure of 160 psi. At the outlet of the valve 10, the pressure is typically about 14 psi. Additionally, the valve 10 must operate at an elevated temperature, typically about 1450° F. The medium which is transported through the valve 10 in this environment often includes iron oxide particles travelling at a high speed. Due to the elevated temperature and the high flow speed, the iron oxide particles become fluidized. As a result, these fluidized iron oxide particles impinge upon and adhere to the opposed valve member surfaces 42 and 44 as well as other surfaces of the valve members 20 and 22. In an extreme case, the buildup may be such that the two valve members 20 and 22 are friction welded together, thus rendering the valve inoperative. To prevent this, the slide valve 10, as shown in FIGS. 1 and 3, includes two fluid conduits 46 and 48. As shown in these figures, the fluid conduits 46 and 48 are aligned at an angle with respect to the direction A of flow of the medium though the fluid passageway 18. Each of the fluid conduits 46 and 48 is formed by a metallic tube such as a stainless steel tube. Surrounding a portion of each tube is a coupling 60. The coupling 60 is used to mount the fluid conduits 46 and 48 to the housing 12. If desired, each coupling 60 may be welded to the housing 12. The coupling 60 is provided with a bore 62 and a stopper 64. The function of bore 62 is as follows. When the fluid conduit 46 gets plugged beyond repair, it must be removed. This is done by cutting the weld between the stopper 64 and the coupling 60. The bore 62 helps in conduit removal by providing room to shake the conduit out. This action is sometimes necessary due to deformation in the shape of the conduit 46 by the hot fluid inside. The stopper 64 is needed to fix the conduit to the valve body and at the same time allows for thermal expansion of the conduit.

The fluid conduits 46 and 48 serve several purposes. First, they allow unwanted gases to be purged from the fluid passageway 18. Furthermore, the fluid conduits may be used to introduce high pressure purge gas into the fluid passageway 18. The high pressure purge gas is used to remove any fluidized iron oxide particles, as well as other debris, from the opposed surfaces 42 and 44 and other surfaces of the valve components during operation of the plant. Preferably, the pressurized purge gas is introduced into the fluid passageway in two different, opposed directions via the fluid conduits. The purge gas may be any suitable gas which is compatible with the solids of the process being carried out in the reactor. The gas is used to clean and to drain. In the case of a reduced iron ore process the purge gas is a mixture of hydrogen (up to 91% $H_2$), carbon dioxide (up to 1% $CO_2$), methane (up to 5% CH$_4$) and carbon monoxide (up to 5% CO) or inert gas such as Nitrogen (N$_2$).

As previously discussed, the slide valve 10 of the present invention is most advantageous. It is rather easy to assemble since there are a minimal number of parts. Similarly, it is easy to disassemble if repairs are required. Additionally, the valve is relatively inexpensive to produce and to install. Most significantly, the valve operates smoothly in a high pressure, high temperature, erosive flow environment.

It is apparent that there has been provided in accordance with the present invention, a slide valve which fully satisfies the means, objects, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A slide valve for use in a high pressure, high temperature, erosive flow system environment, said slide valve comprising:

a valve housing;

means for defining a flow passage for a medium within said valve housing;

a stationary valve member fixed relative to said flow passage;

a valve member movable relative to said flow passage for restricting flow through said flow passage, said movable valve member having an orifice therein and being movable between a first position wherein said orifice is aligned with said flow passage and a second position wherein said orifice is non-aligned with said flow passage; and a plate secured to said stationary valve member for substantially preventing channelling around said stationary valve member.

2. The slide valve of claim 1 wherein said flow passage defining means comprises a liner formed from a refractory material within said valve housing.

3. The slide valve of claim 2 further comprising:

a first recess in said refractory material; and said plate being positioned within said recess.

4. The slide valve of claim 3 further comprising:

said stationary valve member having an opening therein aligned with said flow passage.

5. The slide valve of claim 3 further comprising:

a tube embedded within said refractory material to substantially prevent channelling through said refractory material;

an inner wall of said tube defining a portion of said flow passage and being aligned with a wall of the refractory material defining the flow passage; and said plate being joined to said tube.

6. The slide valve of claim 5 further comprising:

said plate being formed from a metallic material;

said tube being formed from a metallic material; and said plate being welded to said tube.

7. The slide valve of claim 1 further comprising:

said stationary valve member having an opening aligned with said flow passage; and means for introducing a fluid medium into said flow passage for cleaning surfaces of said stationary valve member and said movable valve member.

8. The slide valve of claim 7 wherein said fluid medium introducing means comprises:

a first conduit positioned upstream of said stationary valve member for introducing purge gas under pressure into said flow passage so that said purge gas flows in a first direction; and a second conduit positioned downstream of said stationary valve member for introducing purge gas under pressure into said flow passage so that said purge gas flows in a second direction opposed to said first direction, whereby said pressurized purge gas being introduced into said flow passage by said first and second conduits flows into a gap between said stationary and movable valve members so as to remove fluidized particles and other debris therefrom and thereby prevent said stationary valve member from becoming friction welded to said movable valve member.

9. The slide valve of claim 1 further comprising:

means for guiding movement of said movable valve member relative to said stationary valve member.

10. The slide valve of claim 1 further comprising:

means for moving said movable valve member between said first and second positions.

11. A slide valve for use in a high temperature, high pressure, erosive flow system, said slide valve comprising:

a housing;

a liner formed from a refractory material within said housing;

said liner having a central bore defining a passageway for the flow of a medium through said valve;

a stationary valve member secured to said liner;

said stationary valve member having a first opening aligned with said central bore;

a movable valve member having a second opening, said movable valve member being movable between a first position where said second opening is aligned with said central bore and said first opening and a second position where said fluid passageway is blocked because said second opening is not aligned with either of said central bore and said first opening; and a plate secured to said stationary valve member for substantially preventing channelling around said stationary valve member.

12. The slide valve of claim 11 wherein said plate is positioned within a recess in said refractory material liner.

13. The slide valve of claim 12 further comprising:

a tube embedded within said refractory material liner for substantially preventing channelling around said valve by said flow medium; and said tube having an inner wall defining a bore and said inner wall being aligned with the wall of said refractory material liner defining said central bore.

14. The slide valve of claim 13 further comprising said plate being welded to said tube and to said stationary valve member.

15. The slide valve of claim 14 further comprising said plate being secured to said refractory material liner.

16. The slide valve of claim 11 further comprising means for removing material from opposed surfaces of said stationary and movable valve members so as to prevent said stationary and movable valve members from being friction welded together.

17. The slide valve of claim 16 wherein said material removing means comprises means for introducing purge gas under pressure into said fluid passageway and for allowing said purge gas to impinge upon said opposed surfaces.

18. The slide valve of claim 17 further comprising:

said purge gas introducing means including a first conduit and a second conduit;

said first conduit being angled with respect to said fluid passageway and being located upstream of said stationary valve member; and said second conduit being angled with respect to said fluid passageway and being located downstream of said stationary valve member.

19. A slide valve for use in a high pressure, high temperature, erosive flow system environment, said slide valve comprising:

a valve housing;

means for defining a flow passage for a medium within said valve housing;

a stationary valve member fixed relative to said flow passage;

a valve member movable relative to said flow passage for restricting flow through said flow passage, said movable valve member having an orifice therein and being movable between a first position wherein said orifice is aligned with said flow passage and a second position wherein said orifice is non-aligned with said flow passage; and a tube embedded within said refractory material to substantially prevent channelling through said refractory material, said tube having an inner wall defining a portion of said flow passage.

20. The slide valve of claim 19 wherein said flow passage defining means comprises a liner formed from a refractory material within said valve housing.

21. The slide valve of claim 20 further comprising:

a plate secured to said stationary valve member for substantially preventing channelling around said stationary valve member;

a first recess in said refractory material; and said plate being positioned within said recess.

22. The slide valve of claim 21 further comprising:

said stationary valve member having an opening therein aligned with said flow passage.

23. The slide valve of claim 21 wherein:

said inner wall of said tube is aligned with a wall of the refractory material defining the flow passage; and said plate is joined to said tube.

24. The slide valve of claim 23 further comprising:

said plate being formed from a metallic material;

said tube being formed from a metallic material; and said plate being welded to said tube.

25. The slide valve of claim 19 further comprising:

said stationary valve member having an opening aligned with said flow passage; and means for introducing a fluid medium into said flow passage for cleaning surfaces of said stationary valve member and said movable valve member.

26. The slide valve of claim 19 further comprising:

means for moving said movable valve member between said first and second positions.

27. A slide valve for use in a high temperature, high pressure, erosive flow system, said slide valve comprising;

a housing;

a liner formed from a refractory material within said housing;

said liner having a central bore defining a passageway for the flow of a medium through said valve;

a stationary valve member secured to said liner;

said stationary valve member having a first opening aligned with said central bore;

a movable valve member having a second opening, said movable valve member being movable between a first position where said second opening is aligned with said central bore and said first opening and a second position where said fluid passageway is blocked because said second opening is not aligned with either of said central bore and said first opening; and a tube embedded within said refractory material to substantially prevent channelling through said refractory material, said tube having an inner wall defining a portion of said flow passage.

28. The slide valve of claim 27 further comprising:

a plate secured to said stationary valve member for substantially preventing channelling around said valve by said flow medium; and said plate being positioned within a recess in said refractory material liner.

29. The slide valve of claim 27 wherein said tube has an inner wall aligned with the wall of said refractory material liner defining said central bore.

30. The slide valve of claim 29 further comprising said plate being welded to said tube and to said stationary valve member.

31. The slide valve of claim 30 further comprising said plate being secured to said refractory material liner.

32. The slide valve of claim 28 further comprising means for removing material from opposed surfaces of said stationary and movable valve members so as to prevent said stationary and movable valve members from being friction welded together.

33. The slide valve of claim 28 wherein said material removing means comprises means for introducing purge gas under pressure into said fluid passageway and for allowing said purge gas to impinge upon said opposed surfaces.

34. The slide valve of claim 33 further comprising:

said purge gas introducing means including a first conduit and a second conduit;

said first conduit being angled with respect to said fluid passageway and being located upstream of said stationary valve member; and said second conduit being angled with respect to said fluid passageway and being located downstream of said stationary valve member.

* * * * *